(12) United States Patent
Kim et al.

(10) Patent No.: US 8,696,044 B2
(45) Date of Patent: Apr. 15, 2014

(54) CARGO SCREEN OF VEHICLE LUGGAGE ROOM

(75) Inventors: Jae Hwan Kim, Anyang-si (KR); Seong Hyeon Lee, Hwaseong-si (KR); Yong Chae Kim, Suwon-si (KR); Jae Yong Lee, Ansan-si (KR); Moon Gyu Park, Gwangmyeong-si (KR); Min Ho Cho, Daegu (KR); Sang Woo Park, Gunpo-si (KR); Eun Jeong Yang, Hwaseong-si (KR); Hyoung Shin, Hwaseong-si (KR); Ah Sal Moon, Hwaseong-si (KR); Jae Hak Joo, Hwaseong-si (KR); Hoo Taek Cho, Yongin-si (KR); Jin Ho Hwang, Seoul (KR); Hak Song Lim, Ansan-si (KR); Eun Su Jang, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/529,727

(22) Filed: Jun. 21, 2012

(65) Prior Publication Data
US 2013/0134734 A1 May 30, 2013

(30) Foreign Application Priority Data
Nov. 28, 2011 (KR) .......................... 10-2011-0125370

(51) Int. Cl.
*B60R 5/04* (2006.01)
(52) U.S. Cl.
USPC ..................................... 296/37.16; 296/24.43
(58) Field of Classification Search
USPC ................... 296/37.16, 24.43, 24.44, 100.11, 296/100.14, 98, 136.01, 136.03, 136.1, 296/136.13, 39.1; 160/370.22
See application file for complete search history.

(56) References Cited

U.S. PATENT DOCUMENTS

| | | | | |
|---|---|---|---|---|
| 4,127,301 A * | 11/1978 | Syrowik | ..................... | 296/37.16 |
| 6,312,036 B1 * | 11/2001 | Ehrenberger et al. | ...... | 296/37.16 |
| 7,611,112 B2 * | 11/2009 | Lin | ............. | 248/274.1 |
| 7,641,251 B1 * | 1/2010 | Stepanians | ........ | 296/3 |
| 2013/0134734 A1 * | 5/2013 | Kim et al. | ................. | 296/37.16 |

FOREIGN PATENT DOCUMENTS

| KR | 100783865 B1 | 12/2007 |
|---|---|---|
| KR | 1020090024335 A | 3/2009 |
| KR | 1020100062611 A | 6/2010 |
| KR | 1020110013632 A | 2/2011 |
| KR | 1020110098508 A | 9/2011 |

* cited by examiner

*Primary Examiner* — Glenn Dayoan
*Assistant Examiner* — Gregory Blankenship
(74) *Attorney, Agent, or Firm* — Morgan, Lewis & Bockius LLP

(57) ABSTRACT

A cargo screen of a vehicle luggage room, the cargo screen may include a housing mounted at an upper portion of the vehicle luggage room in a horizontal direction and having a central portion to be foldable, a roller rotatably installed in the housing and having a cut central portion to be foldable, and a screen wound around an outer peripheral surface of the roller in the housing through a cut hole thereof or selectively unwound to the outside of the housing to cover the vehicle luggage room, and having a cut central portion to be foldable.

2 Claims, 4 Drawing Sheets

CARGO SCREEN OF VEHICLE LUGGAGE ROOM

CROSS-REFERENCE TO RELATED APPLICATION

The present application claims priority to Korean Patent Application No. 10-2011-0125370, filed on Nov. 28, 2011 in the Korean Intellectual Property Office, the entire contents of which is incorporated herein for all purposes by this reference.

BACKGROUND OF THE INVENTION

1. Field of the Invention

The present invention relates to a cargo screen of a vehicle luggage room, and more particularly, to a cargo screen of a vehicle luggage room for improving poor reception performance.

2. Description of Related Art

In general, a leisure vehicle capable of loading many cargos therein has been widely popularized. The leisure vehicle includes a cargo screen provided between a rear seat and a rear door thereof in order to make a cargo space clean in view of an appearance and open and close a luggage room.

The cargo screen includes a cover sheet covering a luggage room provided between the rear seat and the rear door of the vehicle and a winding part having the cover sheet wound therearound, wherein the cover sheet opens or closes the luggage room while being wound or unwound from the winding part provided adjacent to the rear seat of the vehicle to an inner side of the rear door by a rotating roller.

Therefore, in the case in which a cargo is loaded in the luggage room, the cover sheet is unwound to prevent the luggage room from being exposed to the outside. In addition, the cargo is loaded in the luggage room in a state in which the cover sheet is wound around the winding part, that is, in a state in which the cover sheet is retracted in order to load the cargo in the luggage room.

In this case, when the cargo screen is not used or more cargos are loaded in the luggage room, the cargo screen is left as it is or is detached and then stored in an appropriate place. That is, when many cargos are loaded, the cargo screen is separated and then stored in an appropriate place or is used in a state in which only the cover sheet is folded and the cargo screen is not separated.

However, according to the related art, there is no space capable of appropriately storing the cargo screen in the luggage room, such that the cargo screen is left in a portion of any space of a cargo box or is used in a state in which it is hung as it is.

Therefore, since there is no space capable of storing the cargo screen after the cargo screen is detached, in the case of loading a cargo, it is difficult to separately store the cargo screen, and in the case of using the cargo screen in a state in which it is hung as it is, the loaded cargo may not be stacked up to an upper end of the cargo screen, such that a problem in loading the cargo may be caused.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cargo screen of a vehicle luggage room for improving poor reception performance.

In an aspect of the present invention, a cargo screen of a vehicle luggage room, may include a housing mounted at an upper portion of the vehicle luggage room in a horizontal direction and having a central portion to be foldable, a roller rotatably installed in the housing and having a cut central portion to be foldable, and a screen wound around an outer peripheral surface of the roller in the housing through a cut hole thereof or selectively unwound to the outside of the housing to cover the vehicle luggage room, and having a cut central portion to be foldable.

The housing may include a left housing and a right housing, the roller may include a left roller and a right roller, and the screen may include a left screen and a right screen.

Each of distal ends of the left screen and the right screen is provided with a left screen panel and a right screen panel to be prevented from being wound into the left housing and the right housing, and each of both ends of the left screen panel and the right screen panel is provided with a fixing member fixing the left screen panel and the right screen panel to the vehicle luggage room.

The left housing and the right housing are hinge-coupled to each other.

The cargo screen may further include a first locking holder provided at an upper end of a coupling surface between the left housing and the right housing.

The cargo screen may further include rugged parts provided at each coupling surface of the left screen panel and the right screen panel and having a mutually corresponding shape.

The cargo screen may further include a second locking holder provided on an upper surface of the rugged parts formed at the left screen panel and the right screen panel to selectively hold the rugged parts.

The cargo screen may further include a cover inserted into a cut portion of the left housing and the right housing at the time of folding the housing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
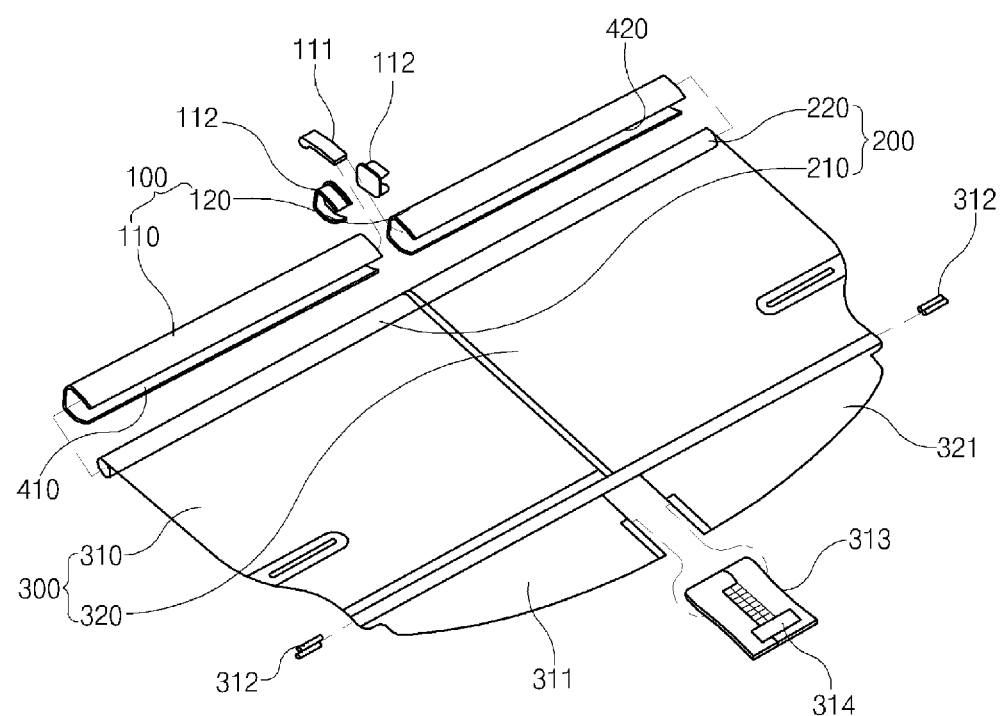
FIG. 1 is an exploded perspective view showing a cargo screen of a vehicle luggage room according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
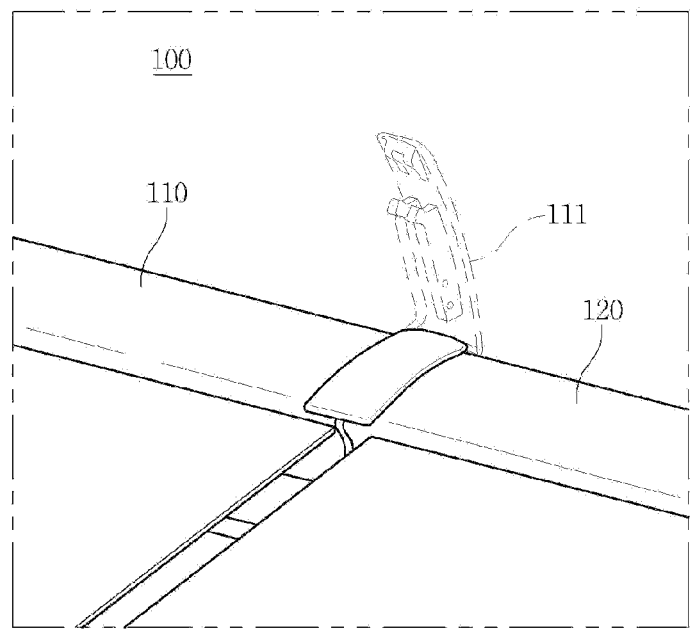
FIG. 2 is a view showing a housing in the cargo screen of the vehicle luggage room according to the exemplary embodiment of the present invention.
Figure 3:
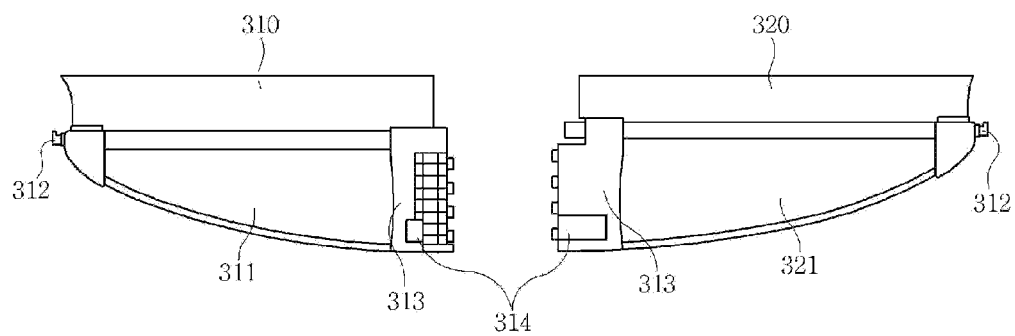
FIG. 3 is a view showing a left screen panel and a right screen panel in the cargo screen of the vehicle luggage room according to the exemplary embodiment of the present invention.

FIGS. 1 to 5 are views showing a cargo screen of a vehicle luggage room according to an exemplary embodiment of the present invention, wherein FIG. 1 is an exploded perspective view showing a cargo screen of a vehicle luggage room according to an exemplary embodiment of the present invention, FIG. 2 is a view showing a housing in the cargo screen of the vehicle luggage room according to the exemplary embodiment of the present invention, and FIG. 3 is a view showing a left screen panel and a right screen panel in the cargo screen of the vehicle luggage room according to the exemplary embodiment of the present invention.

Figure 4:
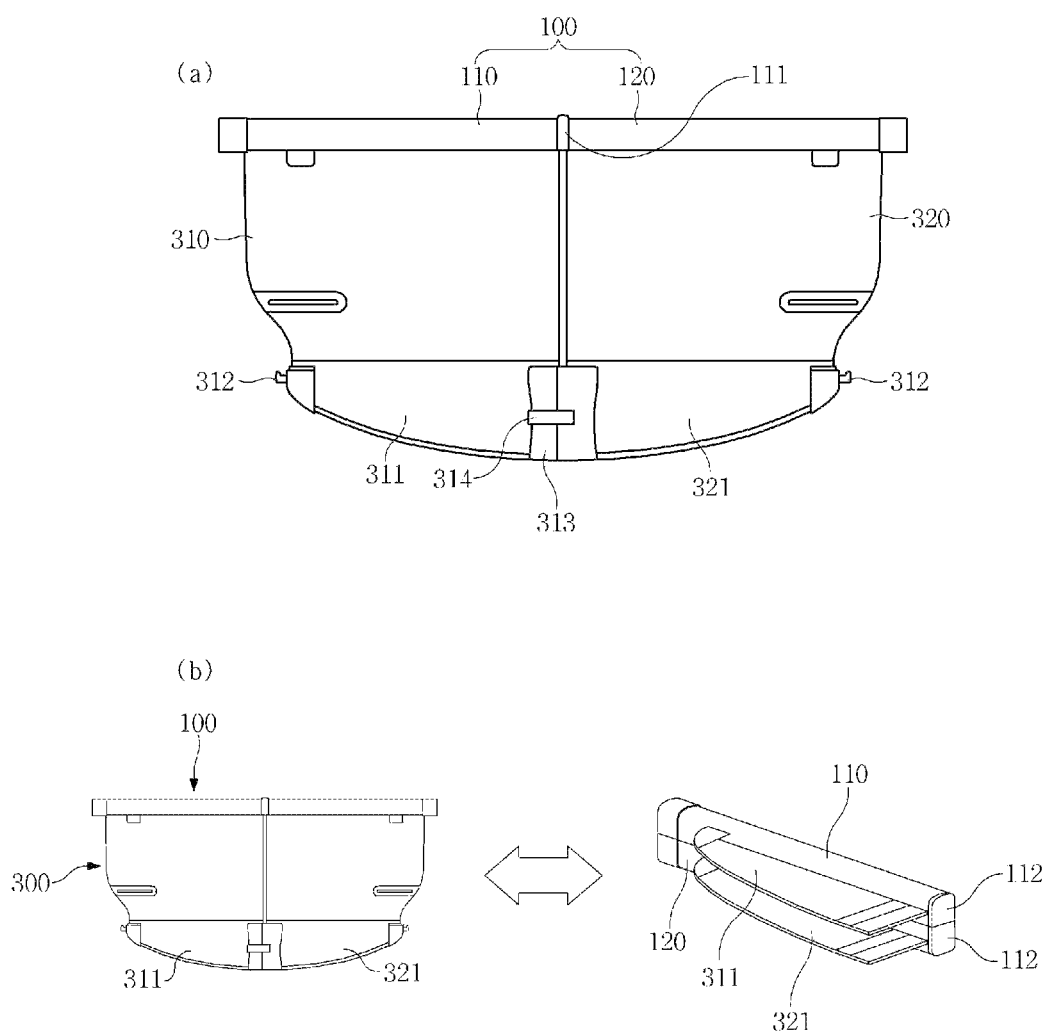
FIG. 4A is a view showing the cargo screen of the vehicle luggage room according to the exemplary embodiment of the present invention.
FIG. 4B is a view showing an unfolded state and a folded state of the cargo screen of the vehicle luggage room according to the exemplary embodiment of the present invention.
Figure 5:
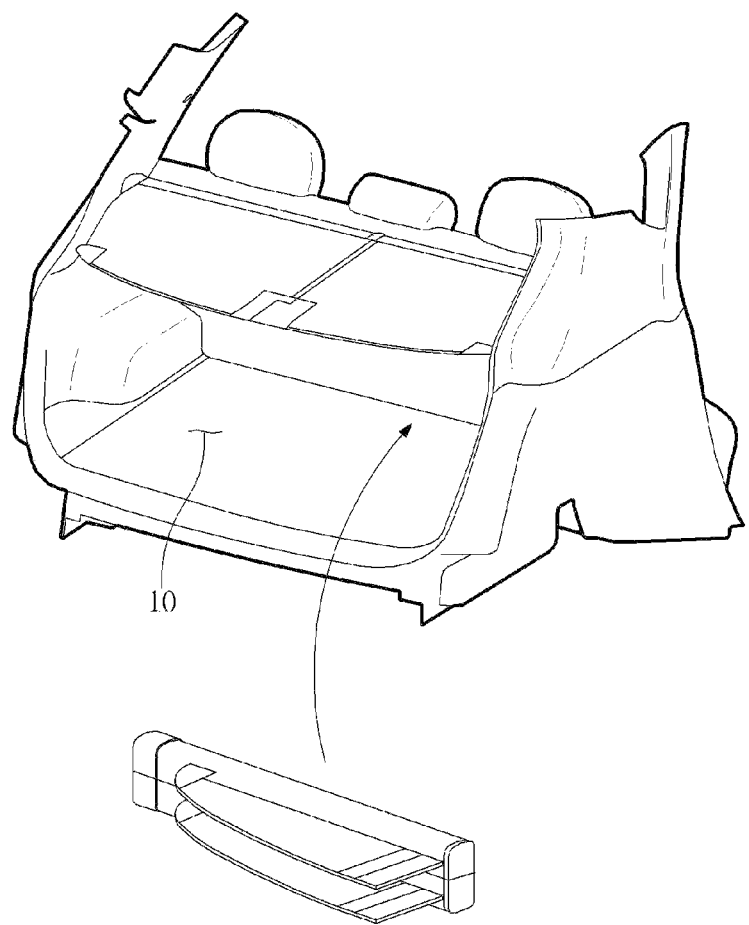
FIG. 5 is a view showing an example of the cargo screen of the vehicle luggage room according to the exemplary embodiment of the present invention.

In addition, FIG. 4 is a view showing the cargo screen of the vehicle luggage room according to the exemplary embodiment of the present invention, and FIG. 5 is a view showing an example of the cargo screen of the vehicle luggage room according to the exemplary embodiment of the present invention.

Exemplary embodiments of the present invention will be described in detail with reference to the accompanying drawings.

A cargo screen of a vehicle luggage room according to an exemplary embodiment of the present invention is configured to include a housing 100 mounted in a vehicle luggage room 10 and provided to be folded, a roller 200 provided in the housing 100 in a cut state, and a screen 300 provided on an outer peripheral surface of the roller 200, provided to be wound and unwound from the housing 100, and having a cut central portion, as shown in FIGS. 1 to 5, such that the housing may be folded at the time of storing the cargo screen, thereby improving space utilization of the vehicle luggage room.

Hereinafter, each component of the cargo screen of the vehicle luggage room according to the exemplary embodiment of the present invention will be described with reference to the accompanying drawings.

First, the cargo screen of the vehicle luggage room according to the exemplary embodiment of the present invention is basically configured to include the housing 100 mounted in the vehicle luggage room 10 (See FIG. 5), the roller 200 installed in the housing 100, and the screen 300 provided to be wound around and unwound from the roller 200, as shown in FIG. 1.

The housing has a pipe shape in which it include a hollow formed therein and is mounted at an upper portion of the vehicle luggage room 10 (at a height of a rear seat) in a horizontal direction.

The housing 100 has a cut central portion, such that it may be folded.

Here, the housing 100 may include a left housing 110 and a right housing 120, and a hinge may be coupled to the cut portion so that the left housing 110 and the right housing 120 may be folded.

As shown in FIGS. 1 and 2, an upper end of the cut portion of the left housing 110 and the right housing 120 is provided with a first locking holder 111, such that in the case in which the left housing 110 and the upper housing 120 are unfolded, the left housing 110 and the right housing 120 may be maintained in a horizontal state.

Meanwhile, in the case in which the left housing 110 and the right housing 120 are folded, a cover 112 covering the cut portion of the left housing 110 and the right housing 120 is additionally provided to prevent foreign materials from being introduced into the left housing 110 and the right housing 120.

The roller 200 is rotatably installed in the housing 110 and is provided in a state in which a central portion thereof is cut.

The roller 200 may include a left roller 210 and a right roller 220.

Here, the reason why the roller is provided in a state in which it is cut into the left roller 210 and the right roller 220 is that since the housing 100 includes the left housing 110 and the right housing 120, in the case in which the left housing 110 and the right housing 120 are folded, the roller 200 needs to be divided into the left roller 210 and the right roller 220 in order to be provided in the left housing 110 and the right housing 120.

The screen 300 stands by in a state in which it is wound around an outer peripheral surface of the roller 200 through cut holes 410 and 420 of the housing 100, is selectively unwound to the outside of the housing 100 through the cut holes 410 and 420 according to the user's intention to cover the vehicle luggage room 10 (See FIG. 5), and is provided in a state in which a central portion thereof is cut.

Meanwhile, one end of the housing 100 may be formed with an input and output hole so that the screen 300 may be wound and unwound.

The screen 300 may include a left screen 310 and a right screen 320.

Here, the reason why the screen is provided in a state in which it is cut into the left screen 310 and the right screen 320 is that since each of the housing 100 and the roller 200 includes the left housing 110 and the right housing 120 and the left roller 210 and the right roller 200, in the case in which the left housing 110 and the right housing 120 are folded, the screen 300 needs to be provided as the left screen 310 and the right screen 320, similar to the roller 200 provided as the left roller 210 and the right roller 220 in each of the left housing 110 and the right housing 120.

Here, each of distal ends of the left screen 310 and the right screen 320 is provided with a left screen panel 311 and a right screen panel 321. Therefore, when each of the left screen 310 and the right screen 320 is wound into the left housing 110 and the right housing 120, each of the left screen panel 311 and the right screen panel 321 is prevented from being wound into the left housing 110 and the right housing 120, thereby making it possible to improve usability.

In addition, each of both ends of the left screen panel 311 and the right screen panel 321 is additionally provided with a fixing member 312, thereby making it possible to fix the left screen panel 311 and the right screen panel 321 each connected to the left screen 310 and the right screen 320 to the vehicle luggage room 10 (See FIG. 5).

In this configuration, a catching part corresponding to the fixing member 312 may be formed on a side of the vehicle luggage room 10 (See FIG. 5).

As shown in FIGS. 3 and 4, a coupling surface between the left screen panel 311 and the right screen panel 321 is additionally provided with a rugged part 313 having a mutually corresponding shape. Therefore, when the left housing 110 and the right housing 120 are unfolded and are thus maintained in a horizontal state, the left screen panel 311 and the right screen panel 321 may also be maintained in a shape in which they are coupled to each other.

Here, an upper surface of the rugged part 313 formed at the left screen panel 311 and the right screen panel 321 is provided with a second locking holder 314, thereby making it easy to maintain the left screen panel 311 and the right screen panel 321 in a horizontal state.

Hereinafter, an operation and effect of the present invention will be described.

In a step of disassembling the cargo screen of the vehicle luggage room according to the exemplary embodiment of the present invention, the second locking holder 314 provided between the left screen panel 311 and the right screen panel 321 rotates to separate the left screen panel 311 and the right screen panel 321 from each other, thereby separating the left screen 310 and the right screen 320 from each other. After the left screen 310 and the right screen 320 are separated from each other, the first locking holder 111 provided between the left housing 110 and the right housing 120 rotates to allow the left housing 110 and the right housing 120 to be folded, such that the cargo screen may be stored in the vehicle luggage room 10 (See FIG. 5).

Meanwhile, in a step of assembling the cargo screen of the vehicle luggage room according to the exemplary embodiment of the present invention, the folded left housing 110 and right housing 120 is allowed to be horizontal, the first locking holder 111 rotates to integrate the left housing 110 and the right housing 120 with each other, the rugged part 313 formed at the coupling surface between the left screen panel 311 and the right screen panel 321 is adjusted, and the second locking holder 314 formed on the upper surface of the rugged part 313 then rotates to integrate the left screen panel 311 and the right screen panel 321 with each other, thereby completing the assembling of the cargo screen.

The cargo screen of the vehicle luggage room according to the exemplary embodiment of the present invention as described above is configured to include the housing mounted at an upper portion of the vehicle luggage room in the horizontal direction and having a central portion provided to be folded, the roller rotatably installed in the housing and having a cut central portion, and the screen standing by in a state in which it is wound around the outer peripheral surface of the roller, selectively unwound to the outside of the housing to cover the vehicle luggage room, and having a cut central portion. Therefore, the housing may be folded at the time of storing the cargo screen, such that the space utilization of the vehicle luggage room is improved, thereby making it possible to improve marketability. In addition, the cargo screen is folded, such that the cargo screen is easily stored and moved, thereby making it possible to improve convenience of use thereof.

As set forth above, according to the exemplary embodiment of the present invention, the housing may be folded at the time of storing the cargo screen, such that space utilization of the vehicle luggage room is improved, thereby making it possible to improve marketability. In addition, the cargo screen is folded, such that the cargo screen is easily stored and moved, thereby making it possible to improve convenience of use thereof.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cargo screen of a vehicle luggage room, the cargo screen comprising:
    a housing mounted at an upper portion of the vehicle luggage room in a horizontal direction and having a central portion to be foldable;
    a roller rotatably installed in the housing and having a cut central portion to be foldable; and
    a screen wound around an outer peripheral surface of the roller in the housing through a cut hole thereof or selectively unwound to the outside of the housing to cover the vehicle luggage room, and having a cut central portion to be foldable;
    wherein the housing includes a left housing and a right housing, the roller includes a left roller and a right roller, and the screen includes a left screen and a right screen;
    further comprising a cover inserted into a cut portion of the left housing and the right housing at the time of folding the housing.

2. The cargo screen according to claim 1, wherein each of distal ends of the left screen and the right screen is provided with a left screen panel and a right screen panel to be prevented from being wound into the left housing and the right housing, and each of both ends of the left screen panel and the right screen panel is provided with a fixing member fixing the left screen panel and the right screen panel to the vehicle luggage room.

* * * * *